US011760856B2

(12) United States Patent
Cocquet et al.

(10) Patent No.: US 11,760,856 B2
(45) Date of Patent: Sep. 19, 2023

(54) NON-CROSSLINKED COPOLYMER FOAM COMPOSITION WITH POLYAMIDE BLOCKS AND POLYETHER BLOCKS

(71) Applicant: Arkema France, Colombes (FR)

(72) Inventors: Clio Cocquet, Bernay (FR); Helena Cheminet, Bernay (FR); François Fernagut, Le Val David (FR); Yves Deyrail, Evreux (FR); Quentin Pineau, Evreux (FR)

(73) Assignee: ARKEMA FRANCE, Colombes (FR)

( * ) Notice: Subject to any disclaimer, the term of this patent is extended or adjusted under 35 U.S.C. 154(b) by 152 days.

(21) Appl. No.: 16/468,197

(22) PCT Filed: Feb. 8, 2018

(86) PCT No.: PCT/FR2018/050312
§ 371 (c)(1),
(2) Date: Jun. 10, 2019

(87) PCT Pub. No.: WO2018/146426
PCT Pub. Date: Aug. 16, 2018

(65) Prior Publication Data
US 2019/0382546 A1 Dec. 19, 2019

(30) Foreign Application Priority Data

Feb. 8, 2017 (FR) ...................................... 1751046

(51) Int. Cl.
*C08J 9/06* (2006.01)
*C08J 9/00* (2006.01)
*C08K 3/013* (2018.01)
*C08J 9/08* (2006.01)
*C08J 9/12* (2006.01)
*C08L 87/00* (2006.01)
*C08K 3/26* (2006.01)

(52) U.S. Cl.
CPC ........... *C08J 9/0061* (2013.01); *C08J 9/0066* (2013.01); *C08J 9/08* (2013.01); *C08J 9/122* (2013.01); *C08K 3/013* (2018.01); *C08L 87/005* (2013.01); *C08J 2201/03* (2013.01); *C08J 2203/02* (2013.01); *C08J 2203/06* (2013.01); *C08J 2203/10* (2013.01); *C08J 2203/22* (2013.01); *C08J 2205/052* (2013.01); *C08J 2367/00* (2013.01); *C08J 2371/02* (2013.01); *C08J 2375/04* (2013.01); *C08J 2377/00* (2013.01); *C08K 2003/262* (2013.01)

(58) Field of Classification Search
CPC . C08J 9/0061; C08J 9/0066; C08J 9/08; C08J 9/122; C08J 2201/03; C08J 2203/02; C08J 2203/06; C08J 2203/10; C08J 2203/22; C08J 2205/052; C08J 2367/00; C08J 2371/02; C08J 2375/04; C08J 2377/00; C08J 9/141; C08J 9/143; C08J 9/147; C08J 2203/14; C08J 2203/16; C08J 2203/184; C08J 9/32; C08K 3/013; C08K 2003/262; C08L 7/005
See application file for complete search history.

(56) References Cited

U.S. PATENT DOCUMENTS

| | | | | | |
|---|---|---|---|---|---|
| 5,102,420 | A | * | 4/1992 | Hunter | A61L 17/145 427/2.31 |
| 2011/0294910 | A1 | * | 12/2011 | Kriha | C08J 9/232 521/59 |
| 2016/0297943 | A1 | | 10/2016 | Däschlein et al. | |
| 2017/0283555 | A1 | * | 10/2017 | Takano | B29C 44/00 |

FOREIGN PATENT DOCUMENTS

| | | |
|---|---|---|
| EP | 0402883 A2 | 12/1990 |
| EP | 0405227 A2 | 1/1991 |
| EP | 0613919 A1 | 9/1994 |
| EP | 1482011 A1 | 12/2004 |
| EP | 1645588 A1 | 4/2006 |
| EP | 1650255 A1 | 4/2006 |
| EP | 3202835 A1 | 8/2017 |
| FR | 856752 A | 8/1940 |
| FR | 950637 A | 10/1949 |
| FR | 2846332 A1 | 4/2004 |
| JP | H03-128949 A | 5/1991 |
| JP | 2001-199347 A | 7/2001 |
| JP | 2004346274 A | 12/2004 |
| JP | 2004352794 A | 12/2004 |
| JP | 2005-29699 A | 2/2005 |
| WO | 2005/005527 A1 | 1/2005 |
| WO | 2013148841 A2 | 10/2013 |
| WO | 2015052265 A1 | 4/2015 |
| WO | 2016052387 A1 | 4/2016 |
| WO | WO-2016052387 A1 * | 4/2016 ............. C08G 69/08 |

OTHER PUBLICATIONS

International Search Report (PCT/ISA/210) dated Apr. 11, 2018, by the European Patent Office as the International Searching Authority for International Application No. PCT/FR2018/050312.
Written Opinion (PCT/ISA/237) dated Apr. 11, 2018, by the European Patent Office as the International Searching Authority for International Application No. PCT/FR2018/050312.
Office Action (Notice of Reasons for Rejection) dated Aug. 2, 2021, by the Japanese Patent Office in corresponding Japanese Patent Application No. 2019-542514, English Translation only. (7 pages).

* cited by examiner

*Primary Examiner* — K. Boyle
(74) *Attorney, Agent, or Firm* — BUCHANAN, INGERSOLL & ROONEY PC

(57) ABSTRACT

The present invention relates to a non-crosslinked block copolymer foam composition, characterised in that it is in the form of a polymer matrix comprising closed cells containing gas, said matrix comprising:
from 90 to 99.9% by weight of said block copolymer; and
from 0.01 to 10% by weight of metal carbonate,
for the total weight of the foam composition.
The present invention also relates to a foamable composition and a method for manufacturing said foam, as well as the use of the foam in sports shoe soles, balloons or balls, gloves, personal protection equipment, rail soles, automobile parts, construction parts, electrical and electronic equipment parts, audio equipment, sound- and/or heat-proofing, and parts used to damp vibrations.

14 Claims, No Drawings

NON-CROSSLINKED COPOLYMER FOAM COMPOSITION WITH POLYAMIDE BLOCKS AND POLYETHER BLOCKS

FIELD OF INVENTION

The present invention relates to a foam formed from a block copolymer as well as a method for manufacturing said foam.

TECHNICAL BACKGROUND

Various polymer foams are used notably in the field of sports equipment such as soles or sole components; rackets or golf balls; personal protection equipment, in particular for sports activities (jackets, helmet and hull linings etc.); and in the insulation industry, particularly for sound- and/or heat-proofing.

Such applications require a set of special physical properties that ensure: lightness, rebound ability, low compression set, ability to withstand repeated impacts without deforming and ability to return to the initial shape.

EP 0405227 and EP 0402883 describe foams manufactured from various polymers and their use in shoe soles.

EP 1650255 describes crosslinked foams obtained from copolymers with polyamide blocks and polyether blocks.

Crosslinked foams have the drawback of imposing major constraints with regard to the manufacturing method: production time is usually long, manufacturing is in general necessarily in batched mode only, and unwanted chemical products must be handled. Moreover, it is difficult to recycle crosslinked foams after use.

WO 2013/148841 describes a two-layer extrusion process from various polymers, including copolymers with polyamide blocks and polyether blocks.

WO 2015/052265 describes a method for manufacturing expanded thermoplastic particles from any thermoplastic elastomer polymer.

In addition, the Zotefoams company markets crosslinked foams manufactured from copolymers with polyamide blocks and polyether blocks, under the brand name ZOTEK®PEBA. The drawbacks of crosslinking have been recalled above. Moreover, the durability of the products is imperfect.

There are also many foams that are manufactured from thermoplastic polyurethane (TPU) or ethylene-vinyl acetate (EVA). These foams have a relatively narrow range of operating temperature, as well as a relatively low short-time compression set and imperfect durability. Moreover, their manufacturing methods are restrictive.

There is thus a need to provide low-density polymer foams having one or more advantageous properties among:
a high capacity for restoring elastic energy under low-stress loads;
a low compression set; and
high resistance to compression fatigue.

To obtain these advantageous properties, the Applicant has developed a non-crosslinked copolymer foam, in particular a PEBA foam, characterised by:
a density less than or equal to 800 kg/m3, preferably less than or equal to 600 kg/m3, preferably less than or equal to 500 kg/m3, preferably less than or equal to 400 kg/m3, even more preferably less than or equal to 300 kg/m3, and ideally less than or equal to 200 kg/m3;
homogeneous cell sizes (foam pores): with the difference between their inner diameters (cell size in $\mu m$) not exceeding 30%, preferably not exceeding 20%, preferably not exceeding 10%;
smaller cell sizes than those obtained by physical foaming using gas injection; and
a smooth outer surface on the foam pieces.

Cell size is measured by scanning electron microscopy (SEM) on a cross-section of foam.

Advantageously, the D50 of the foam cells in the invention is comprised within the range from 30 to 130 $\mu m$.

The D50 of the foam cells corresponds to the cell size value that divides the population of cells examined exactly in two. In other words, in the foam according to the invention, if the D50 of the cells is less than 130 $\mu m$, 50% of the cells are less than 130 $\mu m$ in size. The D50 can be measured according to ISO standard 9276—Parts 1 to 6: "Representation of data obtained by granulometric analysis." In the present description, a "Quanta 250" SEM from the FEI company and Fraunhofer software were used to obtain the cell size distribution for the foam and deduce the D50.

SUMMARY OF THE INVENTION

The invention thus relates to a foam of non-crosslinked hard-soft block copolymer, characterised in that it is in the form of a polymer matrix comprising closed pores or cells containing gas, said matrix comprising:
from 90 to 99.9% by weight of at least one block copolymer; and
from 0.01% to 10% by weight of metal carbonate, preferably 0.1 to 5%, preferably 0.5 to 5%, preferably 0.7 to 5%, by weight of metal carbonate, measured by thermogravimetric (TG) analysis in accordance with ISO standard 11358: 2011, with respect to the total weight of the foam composition (or matrix).

Advantageously, said gas comprises at least one compound chosen among: $CO_2$, $H_2O$, $N_2$ and mixtures thereof.

Advantageously, said at least one block copolymer comprises at least one block chosen among: the polyether blocks; the polyester blocks; the polyamide blocks; the polyurethane blocks; and combinations thereof.

Preferably, in the composition according to the invention:
the hard blocks in the copolymer have a number-average molecular mass of 200 to 2000 g/mol;
the soft blocks in the copolymer have a number-average molecular mass of 800 to 2500 g/mol; and
The weight ratio of the polyamide blocks to the polyether blocks in the copolymer is from 0.1 to 2.

Advantageously, said copolymer comprises a copolymer with polyamide blocks and polyether blocks. Preferably, the polyamide blocks in the copolymer are polyamide 11, polyamide 12, polyamide 6, polyamide 6.10, polyamide 6.12, polyamide 10.10, polyamide 10.12, and combinations thereof. Preferably, the polyether blocks in the copolymer are polyethylene glycol or polytetramethylene glycol blocks.

Advantageously, the foam composition according to the invention has a density less than or equal to 800 kg/m³, preferably less than or equal to 700 kg/m³, preferably less than or equal to 600 kg/m³, preferably less than or equal to 500 kg/m³, preferably less than or equal to 400 kg/m³, yet more preferably less than or equal to 300 kg/m³, or even less than or equal to 200 kg/m³.

Advantageously, the foam composition in the invention also comprises from 0.1 to 50% by weight of one or several other polymers (different to the block polymer according to the invention), preferably chosen among the ethylene vinyl acetate copolymers, the ethylene-acrylate copolymers, and the ethylene alkyl(meth)acrylate copolymers.

The present invention also relates to:
- an item made of a foam with a composition in accordance with the invention; or
- any element made of a foam with a composition in accordance with the invention; or The present invention relates in particular to an item chosen among a sports shoe sole, a balloon, a ball, gloves, personal protection equipment, a rail sole (damping pad), an automobile part, a stroller part, a wheel, a handle, a seat component, a child car seat component, a construction part, an electrical or electronic equipment part, an audio equipment part, a part used in sound- and/or heat-proofing, a part designed to absorb shocks or damp vibrations such as those generated by transport vehicles, soft-ride wheels such as tyres but requiring no maintenance, and any item comprising a combination of these items.

The present invention also relates to a foamable block copolymer composition comprising:
(a) 90 to 99.5%, preferably 95 to 99%, preferably 95 to 98% by weight of block copolymer as defined in the invention;
(b) 0.5 to 10%, preferably from 1 to 5%, preferably from 2 to 5%, by weight of a foaming agent comprising a metal hydrogen carbonate salt and at least one component chosen among:
a polycarboxilic acid containing 2 to 10 carbon atoms and at least two carboxyl groups;
a metal salt of said acid;
an ester of said polycarboxyilic acid wherein at least one of the carboxyl groups has been esterified with an alcohol containing 1 to 6 carbon atoms;
and mixtures thereof;
wherein the weight percentages are in relation to the total weight of the foamable composition.

Advantageously, the foaming agent comprises an alkaline metal hydrogen carbonate and citric acid or a salt thereof.

According to a particular embodiment of the present invention, the foamable block copolymer composition also comprises from 0.5 to 20% by weight, for the total weight of the composition, in thermoplastic capsules containing a gas and which expand at a temperature comprised within the range of 90 to 250° C., said capsules having an average D50 size comprised within the range of 8 to 20 μm prior to expansion and an average D50 size comprised within the range of 30 to 130 μm after expanding in the foam.

Advantageously, the foamable block copolymer composition according to the invention also comprises from 10 to 50% by weight of a drying agent comprising zeolite and/or an alkaline earth metal oxide.

The present invention also relates to a method for manufacturing a foam according to the invention, comprising the following steps:
providing a foamable composition according to the invention;
heating said composition to a temperature such that the polymer melts and the foaming agent decomposes, which results in $CO_2$, $H_2O$ and/or $N_2$, preferably $CO_2$ and $H_2O$, in the form of gas dispersed within the melted polymer.

Advantageously, the method according to the invention also comprises, in particular in the heating step, the mixture of the melted copolymer with the chemical foaming agent, and optionally with one or more additives.

Advantageously, the method according to the invention comprises an injection step of the composition according to the invention, i.e., the injection of the copolymer-chemical foaming agent mixture into a mould, with the foaming of the mixture (of the composition according to the invention, after it has been heated, being performed:
when it is injected into the mould (short shot technology), and/or
by the opening of the mould (core-back technology).

According to an alternative or supplementary embodiment of the preceding, the method according to the invention comprises the extrusion of said foamable composition, inducing the foaming of said composition by the decomposition of the foaming agent, directly at the extrusion outlet.

According to yet another embodiment, the method according to the invention comprises heating said foamable composition in a reactor ("batch" method) in which it is possible to create thermodynamic instability in the pressure and/or temperature swing, which cause(s) the composition to foam.

According to a particular embodiment of the invention, at least 0.1 to 10%, preferably 0.1 to 3% by weight (for the total weight of the composition) of a physical blowing agent is added in the mixing step, said physical blowing agent being preferably chosen among dinitrogen, carbon dioxide, hydrocarbons, chloroflurocarbons, hydrochlorocarbons, hydrofluorocarbons, hydrochlorofluorocarbons, and mixtures thereof.

Physical foaming agents such as molecular nitrogen $N_2$, carbon dioxide $CO_2$, are found as gases. These gases are soluble under high pressure in the copolymer melt. When the system us depressurised, nucleation and cell growth create a cellular structure.

According to yet another embodiment, $CO_2$ in its supercritical state (fluid with an intermediate composition between the gaseous and liquid state) is used in combination with the composition according to the invention. According to a preferred embodiment of the invention, the method does not require a gas injection device and can thus be used in existing implementation systems already in use to shape the block copolymers, with no changes necessary.

The present invention makes it possible to overcome the drawbacks of the prior art. More particularly, it provides low-density polymer foams having one or more advantageous properties among: a high capacity for restoring elastic energy under low-stress loads, a low compression set, and high resistance to compression fatigue.

Advantageously, these properties are obtained in a wide temperature range, preferably from −20° C. to 50° C., even from −30° C. to 80° C. This is achieved through the use of a non-crosslinked block copolymer, preferably with polyamide blocks and polyether blocks, characterised by particular ranges of molecular mass, notably for the polyamide blocks and polyether blocks, as well as a particular range in the weight ratio between the blocks, respectively between the polyamide blocks and the polyether blocks.

DESCRIPTION OF EMBODIMENTS OF THE INVENTION

The invention is now described in greater detail and in a non-limiting manner in the description which follows.

The invention uses a block copolymer.

"Block copolymer", according to the invention, means thermoplastic elastomer (TPE) polymers, which comprise, in alternation, blocks or segments referred to as "hard" or "rigid" (behaving more like thermoplastics) and blocks or segments referred to as "soft" or "flexible" (behaving more like elastomers). For example, polyamide blocks are known to be "hard" blocks at a melt temperature (TO or glass transition temperature (Tg), that is higher than the temperature at which the polymer is used, while polyether blocks are "soft" blocks if Tf or Tg is lower than the temperature at which said polymer is used More precisely, a block is referred to as "soft" if it has a low glass transition temperature (Tg). "Low glass transition temperature" means a glass transition temperature Tg below 15° C., preferably below 0° C., advantageously below −15° C. and yet more advantageously below −30° C., or even below −50° C.

"Possible flexible or soft blocks in the copolymer according to the invention" means in particular those chosen from among the polyether blocks, polyester blocks, polysiloaxane blocks such as polydimethylsiloxane blocks i.e. PDMS, polyolefin blocks, polycarbonate blocks, and combinations thereof. The possible soft blocks are described, for example, in French patent application No.: 0950637, page 32, line 3, to page 38, line 23. As an example, the polyether blocks are chosen among poly(ethylene glycol) (PEG), poly(1,2-propylene glycol) (PPG), poly(1,3-propylene glycol) (PO3G), poly(tetramethylene glycol) (PTMG), and their copolymers or combinations.

The hard blocks can be polyamide-based, polyurethane-based, polyester-based, or a combination of these polymers. These blocks are described in particular in French patent application No.: 0856752. Hard blocks are preferably polyamide-based. Polyamide (PA) blocks can comprise homopolyamides or copolyamides. The possible polyamide blocks in the composition of the invention are in particular those defined in application FR0950637, from page 27, line 18, to page 31, line 14.

Advantageously, said at least one block copolymer comprises at least one block chosen among: the polyether blocks; the polyester blocks; the polyamide blocks; the polyurethane blocks; and combinations thereof. Examples of hard-soft block copolymers are, respectively, (a) copolymers with polyester blocks and polyether blocks (also known as COPEs or copolyesterethers), (b) copolymers with polyurethane and polyether blocks (also known as TPUs which is the abbreviation for thermoplastic polyurethanes) and (c) copolymers with polyamide and polyether blocks (also known as PEBAs according to the IUPAC, or as polyether-block-amides).

Preferably, said at least one copolymer comprises a copolymer with polyamide blocks and polyether blocks (PEBA).

PEBAs result from the polycondensation of polyamide blocks comprising reactive ends with polyether blocks comprising reactive ends, such as, among others, polycondensation:

1) of polyamide blocks comprising diamine chain ends with polyoxyalkylene blocks comprising dicarboxylic chain ends;

2) of polyamide blocks comprising dicarboxylic chain ends with polyoxyalkylene blocks comprising diamine chain ends, obtained for example by cyanoethylation and hydrogenation of polyoxyalkylène □,□-dihydroxylated aliphatic blocks referred to as polyetherdiols;

3) of polyamide blocks comprising dicarboxylic chain ends with polyether diols, the products obtained in this particular case being polyether ester amides.

The polyamide blocks comprising dicarboxylic chain ends result, for example, from the condensation of polyamide precursors in the presence of a chain-limiting dicarboxylic acid. The polyamide blocks comprising diamine chain ends result, for example, from the condensation of polyamide precursors in the presence of a chain-limiting diamine.

Three types of polyamide blocks can be advantageously used.

According to a first type, the polyamide blocks result from the condensation of a dicarboxylic acid, in particular those having from 4 to 20 carbon atoms, preferably those having from 6 to 18 carbon atoms, and an aliphatic or aromatic diamine, in particular those having from 2 to 20 carbon atoms, preferably those having from 6 to 14 carbon atoms Examples of dicarbolixic acids include 1,4-cyclohexyldicarboxylic acid, the butanedioic, adipic, azelaic, suberic, sebacic, dodecane dicarboxylic, and octadecane dicarboxylic acids, and the terepthalic and isophthalic acids, but also the dimerised fatty acids.

Examples of diamines include tetramethylenediamine, hexamethylenediamine, 1,10-decamethylenediamine, dodecamethylenediamine, trimethylhexamethylenediamine, the isomers of bis(4-aminocyclohexyl)methane (BACM), bis(3-methyl-4-aminocyclohexyl)methane (BMACM), and 2-2-bis(3-methyl-4-aminocyclohexyl) propane (BMACP), para amino dicyclohexyl methane (PACM), isophorone diamine (IPDA), 2,6-bis(aminomethyl)norbornane (BAMN) and piperazine (Pip).

Advantageously, polyamide blocks PA 4.12, PA 4.14, PA 4.18, PA 6.10, PA 6.12, PA 6.14, PA 6.18, PA 9.12, PA 10.10, PA 10.12, PA 10.14 and PA 10.18 are used. In the PAX.Y notation, X conventionally represents the number of carbon atoms from the diamine residues, and Y represents the number of carbon atoms from the diacid residues.

According to a second type, the polyamide blocks result from the condensation of one or more α,Ω-aminocarboxylic acids and/or one or more lactams having from 6 to 12 carbon atoms in the presence of a dicarboxylic acid having from 4 to 12 carbon atoms or of a diamine. Examples of lactams include caprolactam, oenantholactam and lauryllactam. Examples of α,Ω-amino carboxylic acid, include the aminocaproic, 7-aminoheptanoic, 11-aminoundecanoic and 12-aminododecanoic acids.

Advantageously, the polyamide blocks of the second type are blocks of PA 11 (polyundecanamide), PA 12 (polydodecanamide) or PA-6 (polycaprolactam). In the PA X notation, X represents the number of carbon atoms from the amino acid residues.

According to a third type, the polyamide blocks result from the condensation of at least one α,Ω-aminocarboxylic acid (or a lactam), at least one diamine and at least one dicarboxylic acid.

In this case, the polyamide (PA) blocks are prepared by polycondensation:
  of the linear or aromatic aliphatic diamine(s) having X carbon atoms;
  of the dicarboxylic acid(s) having Y carbon atoms; and
  of the comonomer(s) {Z}, chosen among the lactams and the α,Ω-aminocarboxylic acids having Z carbon atoms and equimolar mixtures of at least one diamine with X1 carbon atoms and at least one dicarboxylic acid having Y1 carbon atoms, (X1, Y1) being different from (X, Y),
  said comonomer(s) {Z} being introduced in a proportion by weight of up to 50%, preferably up to 20%, yet more preferably up to 10% in relation to the combined polyamide precursor monomers;
  in the presence of a chain limiter chosen among the dicarboxylic acids.

Advantageously, said dicarboxylic acid having Y carbon atoms is used as chain limiter, which is introduced in excess relative to the stoichiometry of the diamine(s).

According to a variant of this third type, the polyamide blocks result from the condensation of at least two α,Ω-aminocarboxylic acids or of at least two lactams having from 6 to 12 carbon atoms or of a lactam and of an aminocarboxylic acid not having the same number of carbon atoms in the possible presence of a chain limiter. Examples of α,Ω-aminocarboxylic aliphatic acid include the aminocaproic, 7-aminoheptanoic, 11-aminoundecanoic and 12-aminododecanoic acids. Examples of lactams include caprolactam, oenantholactam and lauryllactam. Examples of aliphatic diamines include hexamethylenediamine, dodecamethylenediamine and trimethylhexamethylenediamine. Examples of cycloaliphatic diacids include 1,4-cyclohexanedicarboxylic acid. Examples of aliphatic diacids include butanedioic, adipic, azelaic, suberic, sebacic, dodecanedicarboxylic acids and dimerised fatty acids. These dimerised fatty acids preferably have a dimer content of at least 98%; they are preferably hydrogenated. Examples of these acids are the products marketed under the brand name "PRIPOL" by CRODA, or under the brand name "EMPOL" by BASF, or under the brand name "RADICAID" by OLEON, and polyoxyalkylenes α,Ω-diacids Examples of aromatic diacids include terephthalic acid (T) and isophthalic acid (I). Examples of cycloaliphatic diamines include the isomers of bis(4-aminocyclohexyl)methane (BACM), bis(3-methyl-4-aminocyclohexyl)methane (BMACM) and 2-2-bis(3-methyl-4-aminocyclohexyl)propane (BMACP), and para amino dicyclohexyl methane (PACM). The other commonly-used diamines can be isophoronediamine (IPDA), 2,6-bis(aminomethyl)norbornane (BAMN) and piperazine.

Examples of polyamide blocks of the third type include the following:
  PA 6.6/6, in which 6.6 denotes hexamethylenediamine units condensed with adipic acid and 6 denotes units resulting from the condensation of caprolactam;
  PA 6.6/6.10/11/12, in which 6.6 denotes hexamethylenediamine condensed with adipic acid, 6.10 denotes hexamethylenediamine condensed with sebacic acid, 11 denotes units resulting from the condensation of aminoundecanoic acid, and 12 denotes units resulting from the condensation of lauryllactam.

The notations PA X/Y PA X/Y/Z, etc. relate to copolyamides in which X, Y, Z, etc. represent homopolyamide units as described above.

Advantageously, the polyamide blocks in the copolymer used in the invention comprise polyamide blocks PA 6, PA 11, PA 12, PA 5.4, PA 5.9, PA 5.10, PA 5.12, PA 5.13, PA 5.14, PA 5.16, PA 5.18, PA 5.36, PA 6.4, PA 6.9, PA 6.10, PA 6.12, PA 6.13, PA 6.14, PA 6.16, PA 6.18, PA 6.36, PA 10.4, PA 10.9, PA 10.10, PA 10.12, PA 10.13, PA 10.14, PA 10.16, PA 10.18, PA 10.36, PA 10.T, PA 12.4, PA 12.9, PA 12.10, PA 12.12, PA 12.13, PA 12.14, PA 12.16, PA 12.18, PA 12.36, PA 12.T, or combinations or copolymers thereof; and preferably comprise polyamide blocks PA 6, PA 11, PA 12, PA 6.10, PA 10.10, PA 10.12, or combinations or copolymers thereof.

The polyether blocks consist of alkylene oxide units. The polyether blocks can be in particular PEG (polyethylene glycol) blocks, i.e., consisting of ethylene oxide units, and/or PPG (propylene glycol) blocks, i.e. consisting of propylene oxide units and/or PO3G (polytrimethylene glycol) blocks, i.e. consisting of polytrimethylene ether glycol units and/or PTMG blocks, i.e. consisting of units of tetramethylene glycol also known as polytetrahydrofuran. The PEBA copolymers can include several types of polyethers in their chain; copolyethers can be block or random.

Blocks obtained by bisphenol ethoxylation can also be used, such as bisphenol A, for example. These latter products are described in particular in EP 613919.

The polyether blocks can also be comprised of ethoxylated primary amines. Examples of ethoxylated primary amines include the products of the formula:

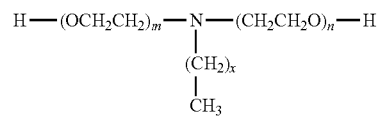

wherein m and n are integers comprised between 1 and 20 and x an integer comprised between 8 and 18. These products are commercially available for example under the brand name NORAMOX® by CECA and under the brand name GENAMIN® by CLARIANT.

The soft polyether blocks can include polyoxyalkylene blocks comprising NH2 chain ends; such blocks can be obtained by cyanoacetylation of □,□-dihydroxylated aliphatic polyoxyalkylene blocks known as polyether diols. More specifically, the commercial products Jeffamine or Elastamine can be used (for example Jeffamine® D400, D2000, ED 2003 XTJ 542, or commercial products from Huntsman, also described in JP 2004346274, JP 2004352794 and EP 1482011).

The polyether diol blocks are either used in unmodified form and copolycondensed with polyamide blocks comprising carboxylic ends, or they are aminated to be converted into polyetherdiamines and condensed with polyamide blocks comprising carboxylic ends. The general method for preparation in two steps of the PEBA copolymers having ester bonds between the PA blocks and the PE blocks is known and is described, for example, in FR 2846332 The general method for preparation of the PEBA copolymers in the invention having amide bonds between the PA blocks and the PE blocks is known and is described, for example, in EP 1482011. The polyether blocks can also be combined with polyamide precursors and a diacid chain limiter to prepare the polymers comprising polyamide blocks and polyether blocks having randomly distributed units (one-step process).

Of course, the PEBA designation in the present description of the invention also relates to the Pebax® marketed by Arkema, the Vestamid® marketed by Evonik®, the Grilamid® marketed by EMS, as well as to the PEBA-type Pelestat® marketed by Sanyo or to any other PEBA from other suppliers.

While the block copolymers described above generally comprise at least one polyamide block and at least one polyether block, the present invention also covers all the alloys of copolymers comprising two, three, four (or more) different blocks chosen from those described in the present description, insofar as these blocks comprise at least one of the polyamide and polyether blocks.

For example, the copolymer according to the invention can be a segmented block copolymer comprising three different blocks (or "triblock"), which results from the condensation of several of the blocks described above. Said triblock is preferably chosen from the copolyesteramides and the copolyetheramideurethanes.

PEBA copolymers that are particularly preferred in the context of the invention are: PA12-PEG, PA6-PEG, PA6/12-PEG, PA11-PEG, PA12-PTMG, PA6-PTMG, PA6/12-PTMG, PA11-PTMG, PA12-PEG/PPG, PA6-PEG/PPG, PA6/12-PEG/PPG, PA11-PEG/PPG, PA11/PO3G, PA6.10/PO3G and/or PA10.10/PO3G.

The foam of the invention comprises a block copolymer such as described above: preferably only one such copolymer is used. However, it is possible to use a mixture of two or more than two block copolymers, in particular several PEBAs, as described above.

According to the invention, the number-average molecular mass of the hard blocks, e.g. polyamide, in the copolymer, e.g. PEBA, is comprised within the range from 200 to 2000 g/mol; the number-average molecular mass of the soft blocks, e.g. polyether, is comprised within the range from 800 to 2500 g/mol.

The number-average molecular mass is set by the chain limiter content. It can be calculated according to the ratio:

$$Mn=(n_{monomer}/n_{limiter})*M_{repeat\ unit}+M_{limiter}$$

$n_{monomer}$=number of moles of monomer
$n_{limiter}$=number of moles of excess diacid
$M_{repeat\ unit}$=Molecular mass of the repeat unit
$M_{limiter}$=Molecular mass of the excess diacid Moreover, according to the invention, the weight ratio of the hard blocks (e.g. polyamide in the case of PEBA) relative to the soft blocks (polyether in the case of PEBA) of the copolymer is from 0.1 to 2.

This weight ratio can be calculated by dividing the number-average molecular mass of the hard blocks, in particular polyamides, by the number-average molecular mass of the soft blocks, in particular polyethers in the case of PEBA.

According to particular embodiments, this ratio is from 0.1 to 0.2; or 0.2 to 0.3; or 0.3 to 0.4; or 0.4 to 0.5; or 0.5 to 0.6; or 0.6 to 0.7; or from 0.7 to 0.8; or 0.8 to 0.9; or 0.9 to 1; or 1 to 1.1; or 1.1 to 1.2; or 1.2 to 1.3; or 1.3 to 1.4; or 1.4 to 1.5; or 1.5 to 1.6; or 1.6 to 1.7; or 1.7 to 1.8; or from 1.8 to 1.9; or 1.9 to 2.

Preferably, the copolymer used in the invention has an instantaneous hardness less than or equal to 40 Shore D, preferably less than or equal to 35 Shore D. Hardness measurements can be performed according to ISO 868: 2003.

The block copolymer, in particular the copolymer with polyamide blocks and polyether blocks, is used to form a foam, without a crosslinking step. The foam according to the invention is formed by mixing the melted copolymer with a blowing or chemical foaming agent, and then performing a foaming step.

According to one embodiment, the foam thus formed consists essentially, or consists, of the copolymer described above (or copolymers, if a mixture of copolymers is used) and the decomposition products of the blowing or chemical foaming agent, the latter being dispersed in the matrix rather than present in the foam cells.

The block copolymer, in particular with polyamide blocks and polyether blocks, can be combined with various additives, e.g., ethylene vinyl acetate or EVA copolymers (such as those marketed under the brand name Evatane® by Arkema), or ethylene acrylate copolymers, or ethylene alkyl (meth)acrylate copolymers, such as those marketed under the brand name Lotryl® by Arkema. These additives can enable adjustment of the hardness, appearance and comfort of the foamed part. These additives can be added in a content of 0.1 to 50% by weight, preferably from 5 to 30% by weight, in relation to the total weight of the composition according to the invention.

The composition according to the invention can also comprise additives, such as nucleating agents, in particular mineral fillers, such as talc. Preferably, their content is from 0.1 to 10% by weight, preferably from 0.1 to 3% by weight for the total weight of the composition according to the invention.

The use in the composition according to the invention of a chemical foaming agent can be coupled to that of a physical blowing agent. Preferably, this is a physical agent such as e.g. dinitrogen or carbon dioxide, or a hydrocarbon, chlorofluorocarbon, hydrochlorocarbon, hydrofluorocarbon, or hydrochlorofluorocarbon (saturated or unsaturated) For example, butane or pentane can be used. In this case, the physical blowing agent is preferably mixed in liquid or supercritical form with the foamable copolymer composition and converted into the gas phase during the foaming step.

According to a preferred embodiment, the foamable copolymer composition according to the invention is injected into a mould and foaming the composition is performed either during its injection into the mould, or by opening the mould. These two techniques, alone or in combination, allow three-dimensional foamed objects with complex geometries to be produced.

It is also a relatively simple technique to implement, in particular with respect to certain processes for melting foamed particles as described in the prior art: in fact, filling a mould with foamed polymer granules and then melting the particles to ensure the mechanical strength of the parts without destroying the foam structure, are complex operations.

Other foaming techniques that can be used are, in particular, "batch" foaming and extrusion foaming.

The foam produced according to the invention preferably has a density from 50 to 800 kg/m3, and in particular more preferably from 100 to 600 kg/m3. Density control can be achieved by adapting the settings to the manufacturing process. Advantageously, the foam according to the invention has a rebound resilience, in accordance with ISO standard 8307:2007, greater than or equal to 55%.

Advantageously, the foam according to the invention has a compression set, in accordance with ISO standard 7214: 2012, of less than or equal to 10%, and in particular more preferably less than or equal to 8%.

Advantageously, this foam has excellent fatigue resistance and damping properties.

The foam according to the invention can be used to manufacture sports equipment such as sports shoe soles, ski boot soles, midsoles, insoles, or functional components of soles, in the form of inserts in the various parts of the sole (heel or arch, for example), or components of shoe uppers in the form of reinforcements or inserts in the structure of the uppers, in the form of protective elements.

It can also be used to manufacture balls, sports gloves (e.g. football gloves), components for golf balls and rackets, protective elements (jackets, linings for helmets and hulls, etc.).

The foam according to the invention displays interesting shock-proofing, noise-proofing and damping properties, in combination with haptic properties adapted to capital goods. It can also be used to manufacture sports shoe soles (or cushioning pads), railway rails, or various parts for the automotive and transport industries, stroller parts such as wheels, handles, or seat components, components for child car seats, construction parts for electrical or electronic equipment and audio equipment, insulating equipment parts, in particular parts used in sound- and/or heat-proofing, in the manufacture of parts designed to absorb shocks or damp vibrations such as those generated by transport vehicles, parts for soft-ride wheels such as tyres but requiring no maintenance, construction parts or parts used in the manufacturing industry.

An advantage of the foam objects according to the invention is that they can easily be recycled, for example by melting them in an extruder equipped with a degassing outlet (optionally after having cut them into pieces).

EXAMPLES

The following examples illustrate the present invention without limiting the scope thereof. In the examples, unless otherwise stated, all percentages and portions are expressed in weight.

The PEBA (Pebax® d'Arkema) copolymers used in the test compositions (examples and comparisons) have the following characteristics listed in the table below:

|  | PEBA No. | |
| --- | --- | --- |
|  | A | B |
| Tf (° C.) | 144 | 159 |
| Tc (° C.) | 61 | 126 |
| Instantaneous hardness (Shore D) | 33 | 54 |
| Hardness at 15s (Shore D) | 25 | 50 |
| Type of PA blocks | PA 12 | PA 12 |
| Type of PE blocks | PTMG | PTMG |
| Weight ratio PA blocks/PE blocks | 0.4 | 2 |
| Mn PA blocks (g/mol) | 850 | 2000 |
| Mn PE blocks (g/mol) | 2000 | 1000 |

Foaming chemical agents used in the test compositions:
FCA1: a mixture based on citric acid and sodium hydrogen carbonate ($NaHCO_3$) (product in the Hydrocerol® range by Clariant).
FCA2: a mixture based on citric acid and sodium hydrogen carbonate ($NaHCO_3$) and containing microspheres (product in the Hydrocerol® range by Clariant).

Plate Extrusion and Density Tests in Accordance with ISO Standards 1183, Using the "Immersion" Measuring Method:

|  | Examples | |
| --- | --- | --- |
|  | 1 | 2 |
| Composition | PEBA A + 2% FCA 2 | PEBA B + 1% FCA1 |
| Density (kg/m3) | 650 | 800 |

Plates are extruded from 2 compositions according to the invention in Examples 1 and 2. It was found that these two compositions displayed a very high aptitude for conversion by extrusion. The foam plates obtained have a surface appearance that is uniform, smooth and seamless, with distinct edges, and a homogeneous distribution of the pores or cells within the foam matrix.

It was found that this homogeneity, both in the distribution and the size of the cells in the foam according to the invention, is obtained:
by a content of at least 1%, preferably at least 2%, by weight of metal carbonate-based foaming agent, used in the foamable composition according to the invention,
and corresponding to a content in metal carbonate remaining in the matrix of the foam obtained of at least 0.1% by weight, preferably at least 0.5% by weight, for the total weight of the foam composition, measured by ATG according to ISO standard 11358: 2011.

The parts obtained have a density of less than or equal to 800 kg/m3.

Plate Injection and Density Tests in Accordance with ISO Standards 1183, Using the "Immersion" Measuring Method:

|  |  | % FCA | Density (kg/m3) |
| --- | --- | --- | --- |
| PEBA B | FCA1 | 2% Ex3 | 510 |
|  |  | 3% Ex4 | 450 |
|  | FCA2 | 2% Ex5 | 550 |
|  |  | 4% Ex6 | 430 |

Use of a foamable composition according to the invention in examples 3 to 6, by a conventional injection method, makes it possible to obtain high-definition, flexible foam parts with a density of less than 600 kg/m3, and even less than 500 kg/m3, without any gas injection step.

In the flexible foam pieces of the invention, the cells (foam pores) are uniform in size: the difference between the inner diameters of the pores (or closed cells) does not exceed 30%.

The foam obtained in examples 1 to 6 according to the invention has a rebound resilience, in accordance with ISO standard 8307:2007, of more than 55%. Moreover, this foam has a compression set, in accordance with ISO standard 7214:2012, of less than 10%.

The foam obtained according to the invention is characterised by its controlled and uniform structure and its mechanical properties, in particular fatigue resistance and damping, which are suitable for use in sports, personal protection equipment, sound- and/or heat-proofing, and the manufacture of parts designed to damp vibrations, in particular transport-related ones.

The invention claimed is:
1. A non-crosslinked hard-soft block copolymer foam composition, wherein the composition is in the form of a polymer matrix containing closed cells containing gas, said matrix comprising:
from 90 to 99.9% by weight of at least one block copolymer; and
from 0.5 to 10% by weight of a metal carbonate dispersed in the matrix,
for the total weight of the foam composition,
wherein:
the hard blocks in the copolymer have a number-average molecular mass of 200 to 2000 g/mol;
the soft blocks in the copolymer have a number-average molecular mass of 800 to 2500 g/mol; and
the weight ratio of the hard blocks to the soft blocks in the copolymer is from 0.1 to 2.

2. The foam composition according to claim 1, wherein said gas comprises at least one compound chosen among: $CO_2$, $H_2O$, $N_2$ and mixtures thereof.

3. The foam composition according to claim 1, wherein said at least one block copolymer comprises at least one block chosen among: polyether blocks; polyester blocks; polyamide blocks; polyurethane blocks; and combinations thereof.

4. The foam composition according to claim 1, wherein said at least one copolymer comprises a copolymer with polyamide blocks and polyether blocks.

5. The foam composition according to claim 4, wherein the polyamide blocks in the copolymer are blocks comprising at least one of the following polyamide units: 11, 12, 6, 6.10, 6.12, 10.10, 10.12, and combinations thereof.

6. The foam composition according to claim 4, wherein the polyether blocks of the copolymer are blocks of polyethylene glycol or polytetramethylene glycol.

7. The foam composition according to claim 1, which also contains from 0.1 to 50% by weight of one or more additives chosen among ethylene vinyl acetate copolymers, ethylene-acrylate copolymers, and ethylene alkyl(meth)acrylate copolymers, and/or from 0.1 to 10% by weight of additives selected from nucleating agents.

8. An item consisting of the foam composition according to claim 1.

9. An item comprising at least one element consisting of the foam composition according to claim 1.

10. An item according to claim 8, chosen among a sports shoe sole, a balloon, a ball, gloves, personal protection equipment, a rail sole, an automobile part, a stroller part, a wheel, a handle, a seat component, a child car seat component, a construction part, an electrical or electronic equipment part, an audio equipment part, a part used in sound- and/or heat-proofing, a part designed to absorb shocks or damp vibrations, soft-ride wheels, and any item comprising a combination of these items.

11. The foam composition according to claim 1, wherein a foam formed from the foam composition is formed from an injection method, without any gas injection step, resulting in a flexible foam with a density of less than 600 kg/m$^3$.

12. The foam composition according to claim 1, wherein the closed cells are uniform in size such that a difference between the inner diameters of the closed cells does not exceed 30%.

13. The foam composition according to claim 1, wherein a foam formed from the foam composition has a rebound resilience, in accordance with ISO standard 8307:2007, of more than 55%.

14. The foam composition according to claim 13, wherein the foam has a compression set, in accordance with ISO standard 7214:2012, of less than 10%.

* * * * *